INVENTOR.
EINAR T. YOUNG
BY George T. Church
ATTORNEY

Feb. 1, 1966 E. T. YOUNG 3,232,484
APPARATUS FOR DISPENSING SELECTED BLENDS OF TWO LIQUIDS
Filed June 5, 1964 8 Sheets-Sheet 2

INVENTOR.
EINAR T. YOUNG
BY George T. Church
ATTORNEY

Feb. 1, 1966      E. T. YOUNG      3,232,484
APPARATUS FOR DISPENSING SELECTED BLENDS OF TWO LIQUIDS
Filed June 5, 1964      8 Sheets-Sheet 3
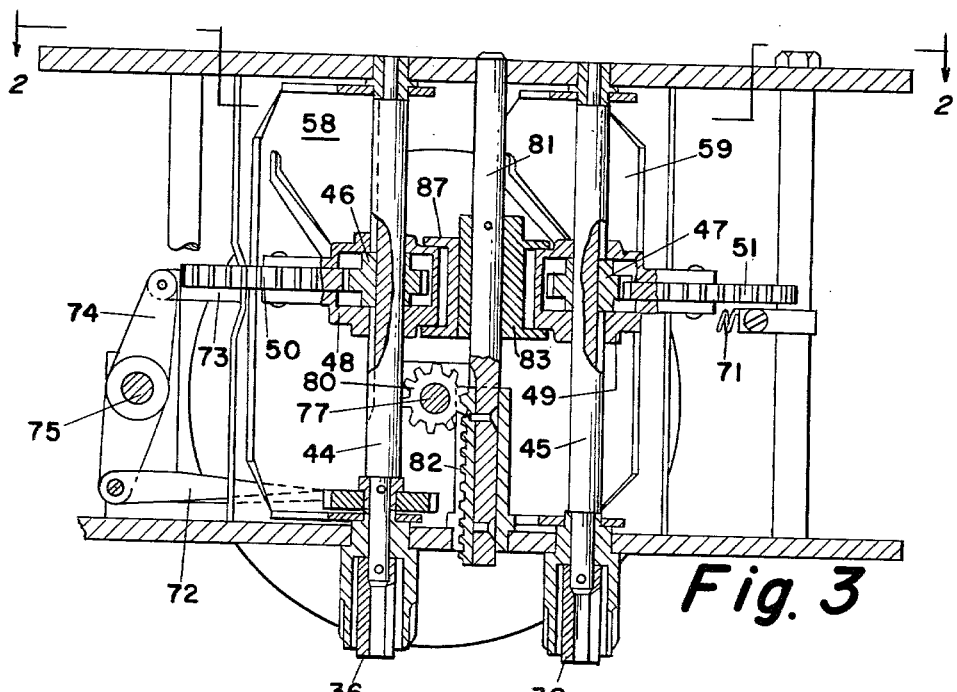
Fig. 3
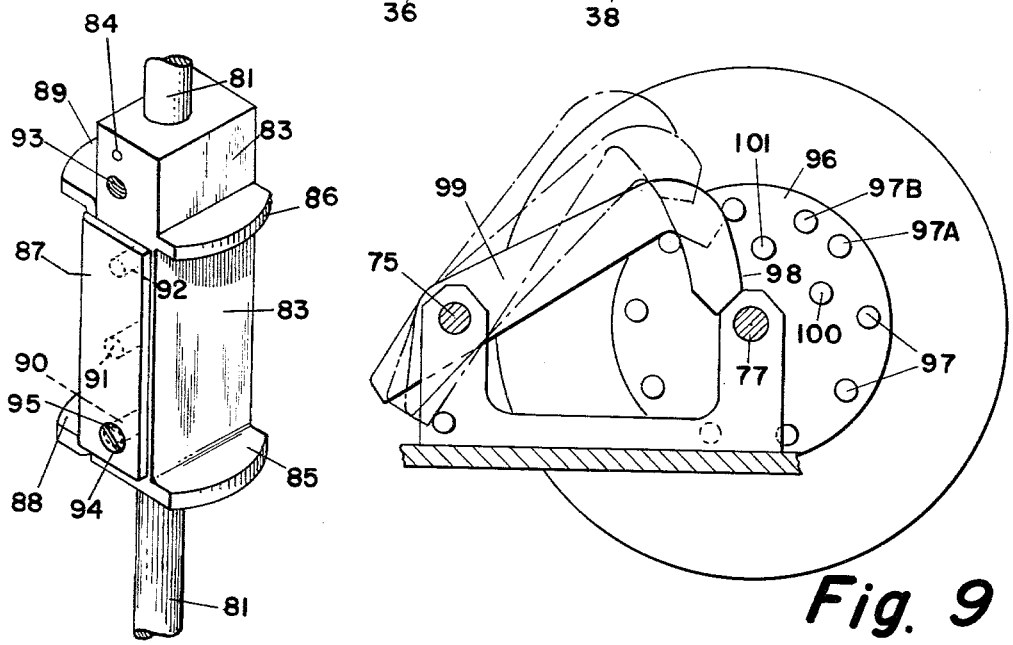
Fig. 8
Fig. 9
INVENTOR.
EINAR T. YOUNG
BY George L. Church
ATTORNEY Feb. 1, 1966 E. T. YOUNG 3,232,484
APPARATUS FOR DISPENSING SELECTED BLENDS OF TWO LIQUIDS
Filed June 5, 1964 8 Sheets-Sheet 4

INVENTOR.
EINAR T. YOUNG
BY George L. Church
ATTORNEY

Feb. 1, 1966     E. T. YOUNG     3,232,484
APPARATUS FOR DISPENSING SELECTED BLENDS OF TWO LIQUIDS
Filed June 5, 1964     8 Sheets-Sheet 5
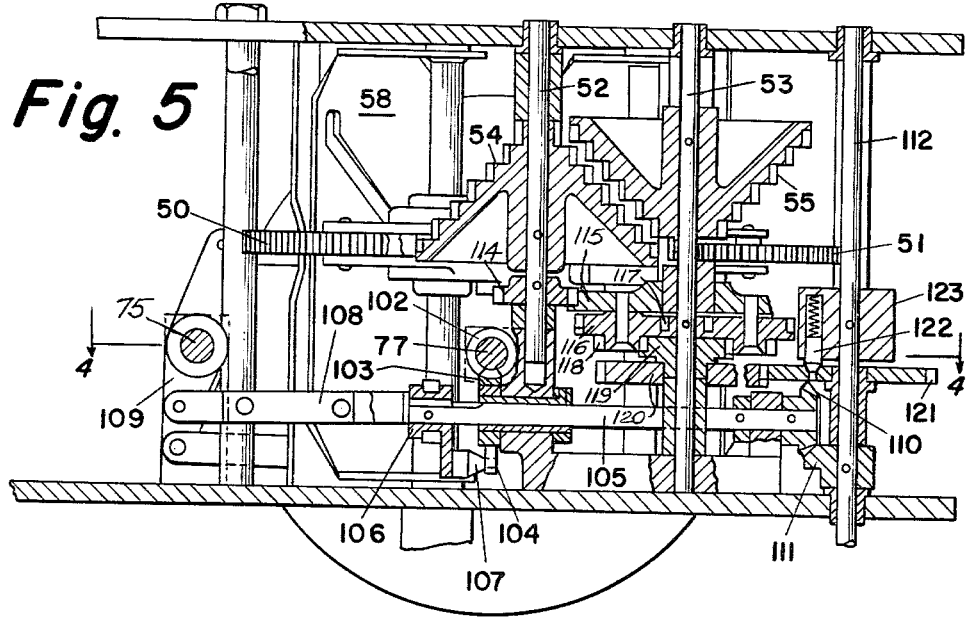
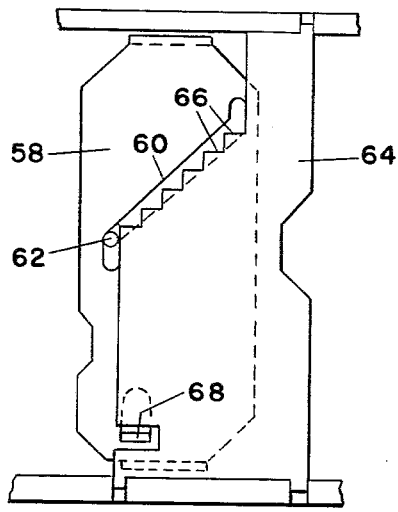
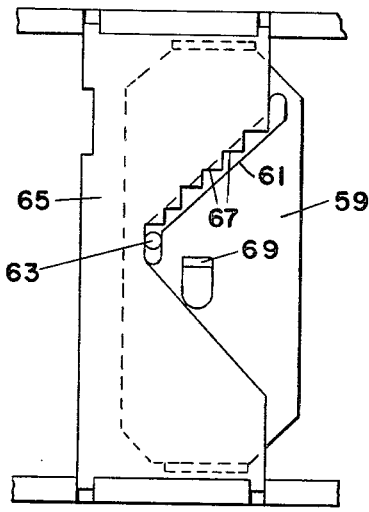
INVENTOR.
EINAR T. YOUNG
BY George L. Church
ATTORNEY

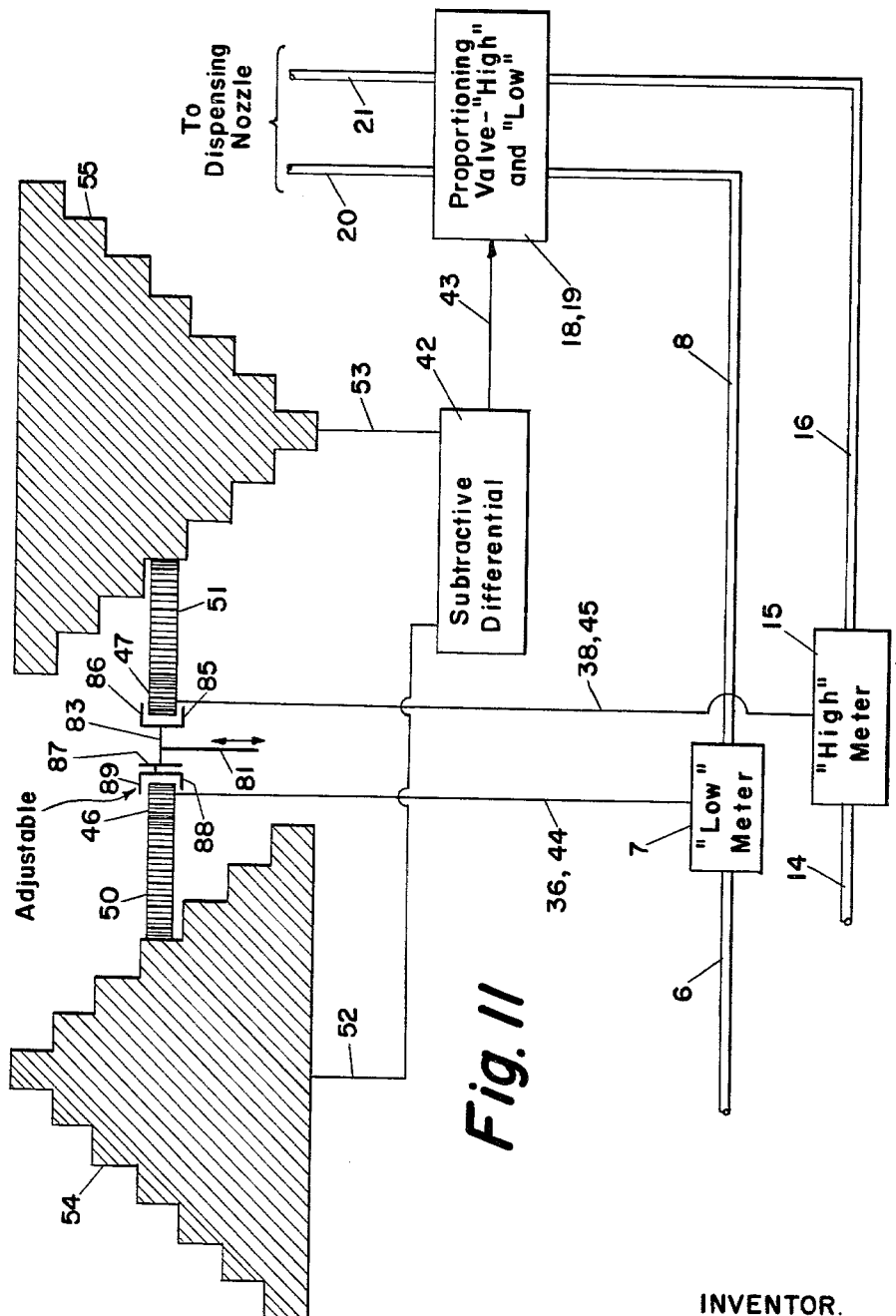

Feb. 1, 1966 E. T. YOUNG 3,232,484
APPARATUS FOR DISPENSING SELECTED BLENDS OF TWO LIQUIDS
Filed June 5, 1964 8 Sheets-Sheet 7

INVENTOR.
EINAR T. YOUNG
BY George L. Church
ATTORNEY

Feb. 1, 1966  E. T. YOUNG  3,232,484
APPARATUS FOR DISPENSING SELECTED BLENDS OF TWO LIQUIDS
Filed June 5, 1964  8 Sheets-Sheet 8
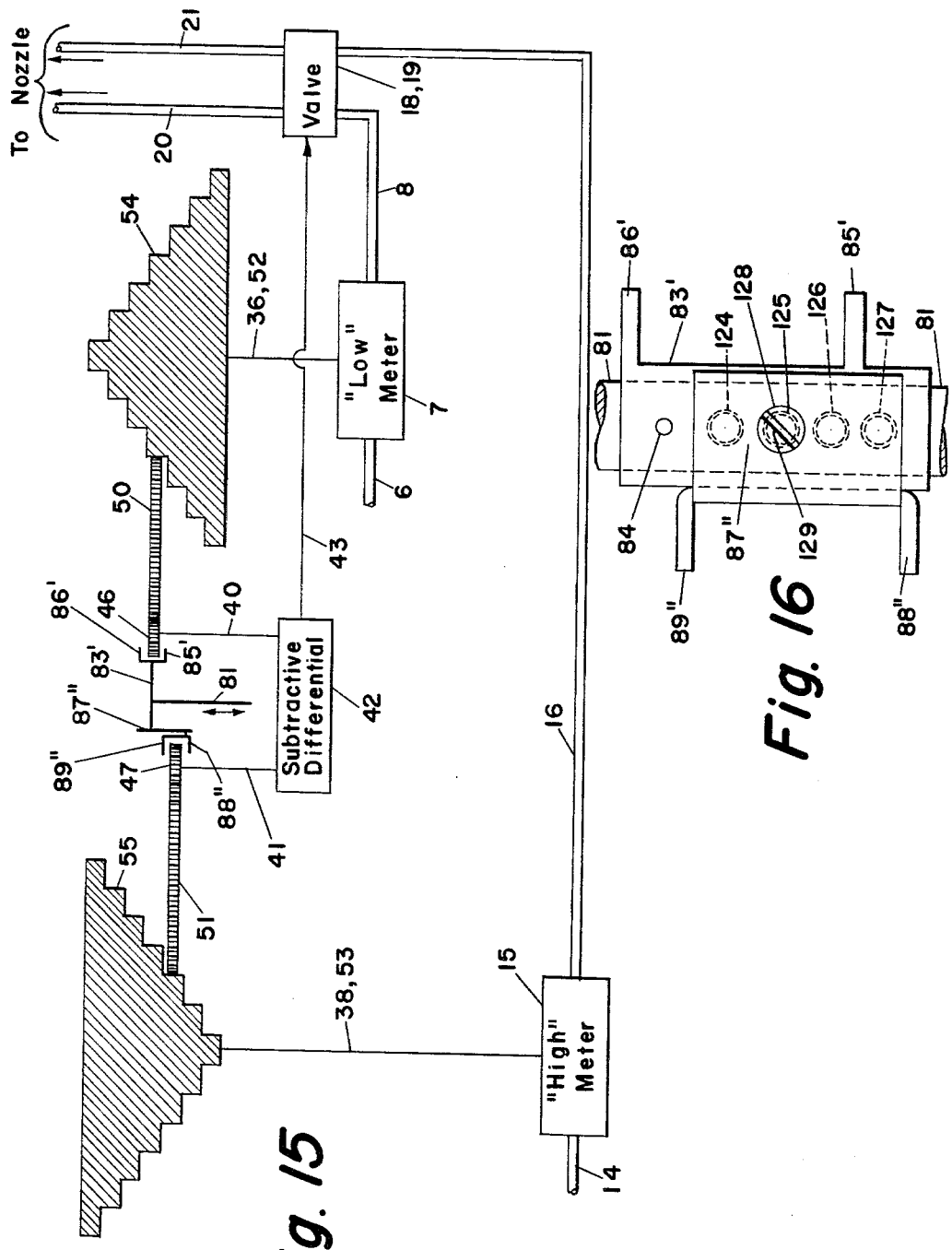
INVENTOR.
EINAR T. YOUNG
BY George T. Church
ATTORNEY

United States Patent Office 3,232,484
Patented Feb. 1, 1966

3,232,484
APPARATUS FOR DISPENSING SELECTED
BLENDS OF TWO LIQUIDS
Einar T. Young, Newtown Square, Pa., assignor to Sun
Oil Company, Philadelphia, Pa., a corporation of New
Jersey
Filed June 5, 1964, Ser. No. 373,012
16 Claims. (Cl. 222—26)

This invention relates to dispensing apparatus particularly adapted for the dispensing of high and low octane motor fuels separately, or of various mixtures or blends of such fuels.

This invention constitutes an improvement over the invention disclosed in my prior Patent No. 2,880,908, dated April 7, 1959.

The said prior patent discloses apparatus in the form of a gasoline "pump" which is settable by the vendor to dispense the grade of gasoline requested by the purchaser, the "pump" being capable of operating to supply to the tank of the purchaser's car a mixture of high and low octane motor fuels, or high-octane fuel alone, or low-octane fuel alone, corresponding to the requested grade. In order to do this, the "pump" draws its supply from two separate tanks; one of these contains a low-octane gasoline (referred to in the prior patent as a "base" gasoline, which may in some cases be thought of as a "regular" gasoline), and the other contains a high-octane gasoline (referred to in the prior patent as an "additive," which may in some cases be thought of as a "premium" or "high test" gasoline, or as "octane concentrate"). For convenience, the "base" or relatively low-octane gasoline will be referred to herein as "low" gasoline, while the "additive" or relatively high-octane gasoline will be referred to herein as "high" gasoline.

The apparatus disclosed in the aforementioned patent is constructed and arranged to be capable of dispensing any one of nine grades of gasoline, comprising seven different blends of "high" and "low" gasolines, plus "high" gasoline alone, plus "low" gasoline alone. For convenience, this apparatus of the prior patent may be termed a "nine-stop" dispensing apparatus or "blending pump." Although it is true that this construction provides for a fairly large number of different grades of gasoline, it is also true that it renders the apparatus somewhat inflexible, and incapable of being adapted in the most economic manner to the demands of the market place.

The "nine-stop" patented dispensing apparatus or "pump" is so constructed that the apparatus is set to the first or bottom stop in order to dispense solely "low" gasoline. Likewise, the apparatus ("pump") must be set to the ninth or top stop in order to dispense "high" gasoline alone. This feature or characteristic is inherent in the mechanical construction of the patented apparatus. As a result of this feature, whenever nine grades of gasoline are not being dispensed, or whenever the top stop is "closed" or "blocked off" for some reason (so that it is not, and in fact cannot, be used by the vendor), solely "high" gasoline is not dispensed. Then, all of the grades of gasoline dispensed (except, of course, that resulting from the setting of the apparatus to the first or bottom stop, to dispense solely "low" gasoline) are blends of the "high" and "low" gasolines. Thus, whenever the high-octane gasoline is used in the pump, it is in effect "downgraded" at the pump, by being mixed with the low-octane gasoline. The octane rating of the "high" gasoline (in the supply tank for the "pump") therefore must, and does under these conditions, exceed the most extreme demands for a "premium" or "high test" gasoline. Since the incremental refining (manufacturing) cost for gasoline, per octane number increase, goes up as the octane number increases, it may be seen that the initial manufacture of a gasoline of extremely high octane rating, only to be followed by its constant "downgrading" in the dispensing pump (by being mixed with "low" gasoline, whenever the "high" gasoline is used at all) to a lower octane rating, is an uneconomic (in fact, an unnecessarily expensive) operation. From an economic standpoint, it would thus be far preferable to provide a "high" gasoline having an octane rating just sufficient to meet the most extreme demands for a "high test" gasoline.

At this juncture, it should be pointed out that, of course, when the octane rating of the "high" gasoline is lowered, more of this gasoline will be required in each blend to give the latter the specified octane rating for that blend. However, this factor is not of sufficient magnitude to overcome the saving (previously referred to) that can be made by providing a "high" gasoline having an octane rating which is not in excess of that demanded for the most critical conditions.

The dispensing of solely "high" gasoline, so as to provide an economic operation in the manner previously described (by reduction in the octane rating of the "high" gasoline, as produced in the refinery), is not commercially feasible with the "nine-stop" dispensing apparatus of the aforesaid patent. For example, marketing experience has shown that nine grades of motor fuel are not needed, and that it is preferred to offer for sale eight grades of fuel, with substantially equal-octane-rating increments between successive grades. Because of the relative inflexibility of the patented pump, to dispense eight grades of fuel (spaced in equal-volume steps, which is equivalent to saying in substantially equal-octane-rating steps) requires that the ninth or top stop of the "nine-stop" pump be closed, i.e., not used; as previously stated, this means that "high" gasoline alone is not dispensed, resulting in an uneconomic operation.

An object of this invention is to provide an arrangement whereby, in a blending pump of the character described in my aforementioned patent, the maximum useable number of stops may be simply and conveniently adjusted and set to a predetermined number which is equal to or less than a maximum number uniquely determined by the construction of the apparatus.

Another object is to provide an improvement over the dispensing apparatus described in my aforementioned patent, whereby the maximum useable number of stops may be simply and conveniently adjusted and set to any number from three to nine, the top stop in all cases providing for the dispensing of solely "high" gasoline.

A further object is to provide an improvement in the dispensing apparatus described in my aforementioned patent, whereby the maximum useable number of stops may be simply and conveniently adjusted and set to any number from three to nine, the arrangement providing equal-volume increments for each and every adjustment.

A still further object is to accomplish the foregoing objects in a relatively simple and inexpensive manner.

The objects of this invention are accomplished, briefly, in the following manner: In a dispensing apparatus for dispensing blends of two liquids, selective gearing, comprising a "high" gear box and a "low" gear box, is used to provide selective couplings between "high" and "low" fluid meters, respectively, and a subtractive-type differential which controls a proportioning valve for the two liquids. In each of the "high" and "low" gear boxes, there is a cone gear having a plurality of levels, and also a proportioning gear which is adapted to mesh at a selected level on its corresponding cone gear. The cone gears in the two gear boxes are identical, except that they are mounted so that one is inverted with respect to the other, and the two cone gears are so arranged that the levels of one cone gear are aligned respectively with the levels of the other cone gear. In order to provide for the selective meshing of each proportioning gear with its cone gear, both proportioning gears are attached to a shaft which is movable in a direction parallel to the longitudinal axes of the cones. This last-mentioned attachment means is made adjustable, so that one of the proportioning gears may be shifted in position relative to the other in a direction parallel to the longitudinal axes of the cones. In this manner, the said one gear may be shifted to and locked in any desired position throughout a range of adjustment, such that the two proportioning gears will concomitantly register with any predetermined levels of the respective cone gears, which levels may or may not be in alignment with each other.

A detailed description of the invention follows, taken in conjunction with the accompanying drawings, wherein:

FIG. 3 is a vertical section taken on the plane indicated at 3—3 in FIG. 2;

FIG. 5 is a vertical section taken on the plane indicated at 5—5 in FIG. 4;

FIGS. 6 and 7 are, respectively, developed views showing certain guide arrangements involved in selection;

FIG. 8 is an isometric view of a bracket assembly involved in "stop adjustment";

FIG. 9 is a vertical section taken on the plane indicated at 9—9 in FIG. 4;

FIG. 11 is a block diagram illustrating the blend control unit;

FIG. 15 is a block diagram similar to FIG. 11, but showing a different arrangement of the blend control unit; and FIG. 16 is a front elevation of a "stop adjustment" bracket assembly suitable for the blend control unit of FIG. 15.

Figure 1:
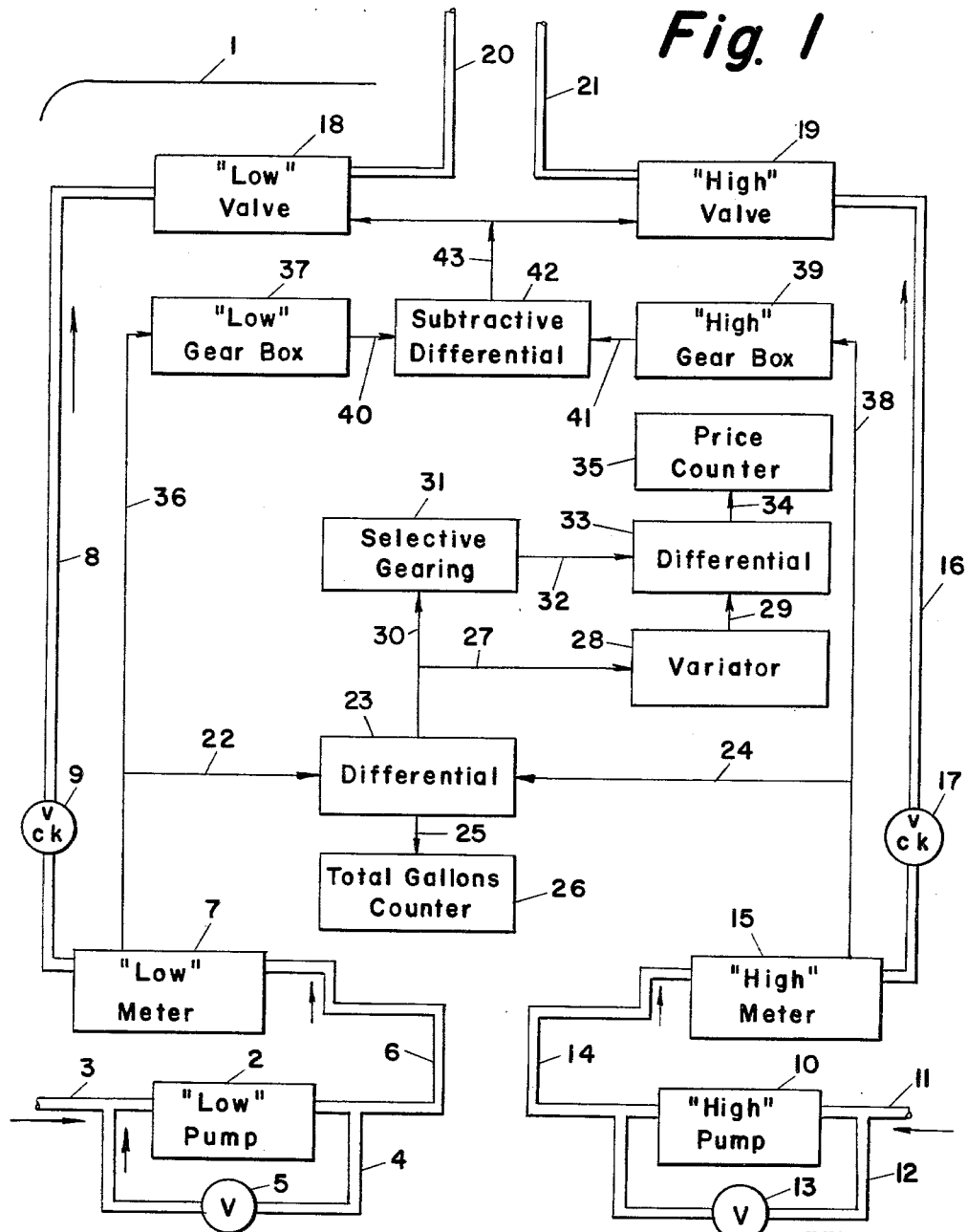
FIG. 1 is a block diagram illustrating the liquid and mechanical connections of various elements involved in a preferred form of pump mechanism.
Figure 2:
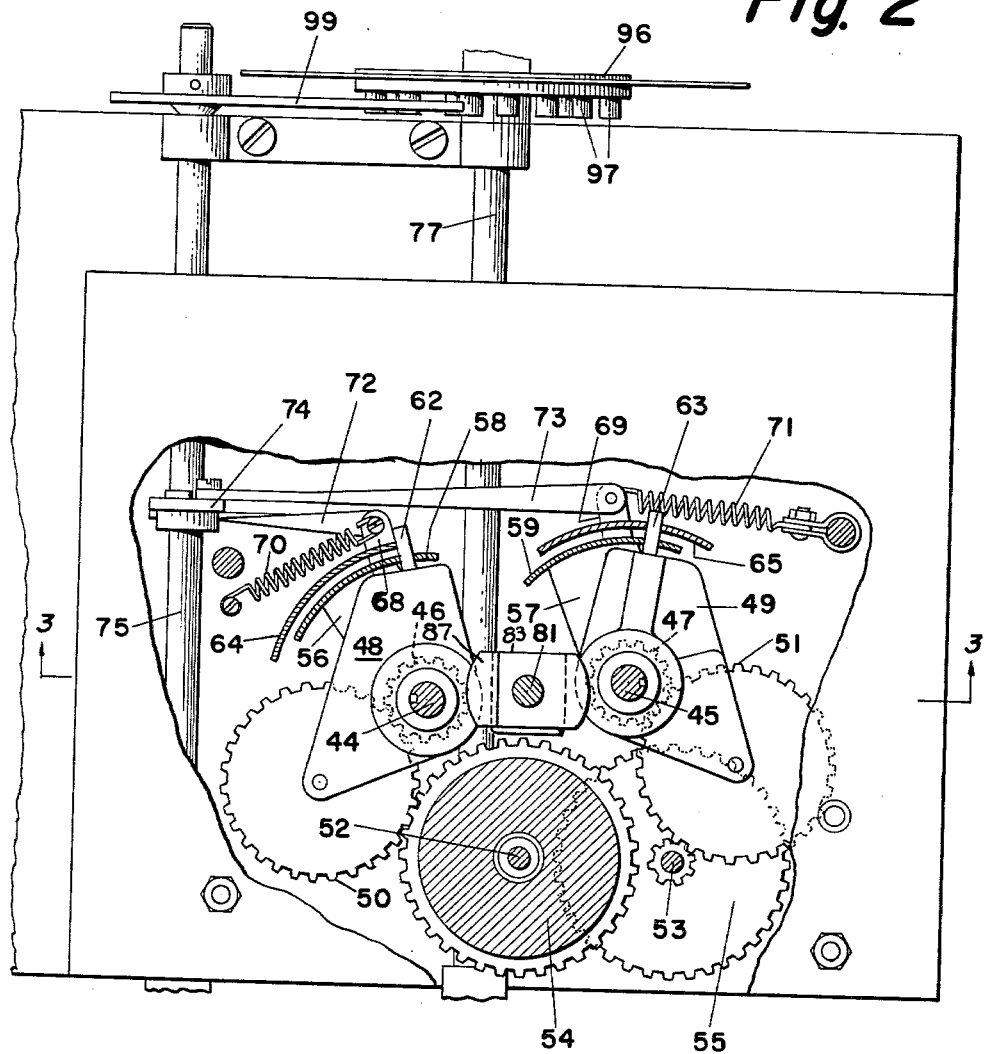
FIG. 2 is a plan view, partially in section on a plane indicated at 2—2 in FIG. 3, showing details of the blend control unit.

A description of the overall operation of the "pump" will first be given. Referring now to FIG. 1, there are diagrammed therein various elements some of which will be later described in detail. The pump housing indicated as 1 may be of generally conventional type, locked against unauthorized access, and provided with windows and various operating devices accessible from the outside of the pump, as will hereafter appear. Where a pump generally is referred to hereafter, it will be understood that it is this casing and the parts contained therein and associated therewith, though possibly in the future certain of the parts conventionally included in such a housing may be located elsewhere. Included in the "pump" apparatus is the "low" gasoline pump 2 driven by a motor in usual fashion and provided with an inlet connection 3 from the "low" supply tank. As usual, a bypass 4 is provided containing a relief valve 5 to bypass the pump in the event that the delivery hose valve is closed. The "low" gasoline to be dispensed flows through connection 6 and a conventional "low" meter 7 and thence through the pipe connection 8 incorporating a check valve 9.

A pump 10 for the "high" gasoline draws its supply of "high" gasoline from a tank through pipe connection 11. This pump 10 may be of the same type as the "low" pump 2 and is preferably driven by a separate motor. Associated with it is a bypass 12 incorporating a relief valve 13.

The "high" gasoline pump 10 delivers the "high" gasoline through line 14 to the "high" meter 15 which may be of the type serving to meter the "low" gasoline. Delivery from the meter 15 takes place through piping 16 which includes the check valve 17.

The "low" and "high" gasolines delivered, respectively, through lines 8 and 16, are respectively controlled by the proportioning valves 18 and 19, from which they are delivered through conduits 20 and 21, which are connected to passages through a hose to a nozzle controlled by a valve, as described in my Patent No. 2,977,970, dated April 4, 1961. The hose passages are maintained separate, communicating with each other closely adjacent to the nozzle control valve, so that admixture of the two components cannot take place to any substantial degree so as to markedly change the composition dispensed.

The solid connecting lines provided with arrows in FIG. 1 indicate mechanical connections. The "low" meter 7 provides one input 22 to a differential 23, the other input to which is provided at 24 from the "high" meter 15. The output of the summing-type differential at 25 represents the sum of the two quantities delivered by the two meters 7 and 15, and operates the total gallons counter 26. This counter is arranged to indicate the total gallons dispensed during an operation, through a suitable window arrangement in the pump housing. A second output from the differential 23, also corresponding to total gallons, is delivered at 27 to a variator 28 in which is set the price per gallon ascribed to the "low" gasoline. The output 29 of this variator then represents the total gallons of both "low" and "high" gasolines multiplied by the price of the "low" gasoline.

A second output from the differential 23, also corresponding to total gallons, is provided at 30 to selective gearing indicated at 31, from which there is provided an output 32. As described in detail in my previously mentioned '908 patent, the selective gearing 31 effects the multiplication of the total gallons dispensed by an amount corresponding to the excess of the price per gallon of a blend being dispensed over the price per gallon ascribed to the "low" gasoline. The output from the selective gearing delivered at 32 provides an input to a summing-type differential 33, the other input to which is 29, the differential providing its output at 34 to a price counter 35, which is arranged to exhibit through a window arrangement in the pump housing the total price of the blend dispensed.

Another output at 36 from the "low" meter 7 provides an input to a "low" gear box 37, while a corresponding output at 38 from the "high" meter 15 provides an input to a "high" gear box 39. The outputs of these gear boxes at 40 and 41 drive a subtractive differential 42, the output of which at 43 controls concurrently the relative positions of the "low" and "high" proportioning valves 18 and 19. In brief, with particular settings of the "low" gear box and "high" gear box, if the meters 7 and 15 indicate a proper ratio of deliveries of "low" and "high" gasolines, the output at 43 is zero and does not affect the settings of the valves 18 and 19. On the other hand, if this correspondence does not exist, an output at 43 adjusts the valves to control the composition of the delivered blend. This will be described in more detail hereinafter.

Actually, although the gear boxes 37 and 39 and the differential 42 are illustrated as separate items in FIG. 1, these items are all associated together in a blend control unit or portion of the "pump." Other portions of the The present invention concerns itself with this blend control unit or portion of the "pump." Other portions of the "pump" (to wit, the counting and indicating portions thereof, including differential 23, gallons counter 26, variator 28, selective gearing 31, differential 33, and price counter 35) form no part of the present invention, so need not be further described herein. These items are described in detail in my '908 patent, previously referred to.

Refer now to FIGS. 2–5 and 9. The shaft connection 36 is driven through suitable gearing from the output of "low" meter 7 and corresponds to gallons of "low" gasoline. The shaft connection 38 is driven through suitable gearing from the output of "high" meter 15 and corresponds to gallons of "high" gasoline. The shaft connections 36 and 38 drive, respectively, shafts 44 and 45 on which are splined pinions 46 and 47. Shafts 44 and 45 may be considered as forming part of the couplings 36 and 38, respectively. These pinions are enclosed in carriers 48 and 49 which are journaled on the shafts 44 and 45 and arranged to slide lengthwise thereof. The carriers 48 and 49 mount proportioning gears 50 and 51 ("range gears") which respectively mesh with the pinions 46 and 47. A pair of shafts 52 and 53 have secured thereto cone gears 54 and 55 (see FIG. 5), with which the gears 50 and 51 are adapted to mesh selectively.

Each of the cone gears 54 and 55 comprises seven spur gears arranged each in a separate level, for a total of seven levels. The two cone gears are identical but, as will be seen in FIG. 5, they are disposed oppositely, that is, they are disposed in parallel but inverted relation with respect to each other. They are so disposed that the levels of the two gears are respectively aligned with each other, reference being made here to a horizontal alignment. By way of example, the numbers of teeth in the various levels are, reading from top to bottom in FIG. 5, as follows: for gear 54, eight teeth, sixteen teeth, twenty-four teeth, thirty-two teeth, forty teeth, forty-eight teeth, and fifty-six teeth; for gear 55, fifty-six teeth, forty-eight teeth, forty teeth, thirty-two teeth, twenty-four teeth, sixteen teeth, and eight teeth.

It is desired to be pointed out that the gears 46, 50, and 54 together comprise the "low" gear box 37 of FIG. 1, while gears 47, 51, and 55 together comprise the "high" gear box 39.

Also journaled on the shafts 44 and 45 are stirrup members 56 and 57 (see FIG. 2) provided with respective arcuate plates 58 and 59 provided in turn with helically arranged slots 60 and 61 which receive pins 62 and 63 projecting from the carriers 48 and 49. Fixed plates 64 and 65 are provided with steps 66 and 67 which are arranged to locate the pins 62 and 63 in their various positions of adjustment in proper alignment with corresponding spur gears or levels of the cone gears. Arms 68 and 69 projecting from the stirrup members 56 and 57 are arranged to be acted upon by tension springs 70 and 71 urging both of the stirrups in an outward direction, and, as will be obvious, the gears 50 and 51 toward meshing positions. Links 72 and 73 are respectively connected to the arms 68 and 69, joining them to the arms of a lever 74 which is secured to a shaft 75. The shaft 75 projects forwardly through the "pump" casing and carries a handle 76 (see FIG. 4) which may be rocked downwardly to disengage the gears 50 and 51 from mesh.

A shaft 77 also projects forwardly through the "pump" casing and carries a knob 78 to which is secured a dial 79 indicating the quality of fuel to be delivered. The shaft 77 has secured thereto a pinion 80.

A shaft 81 is mounted for longitudinal movement, in a direction parallel to the longitudinal axes (center lines of the shafts 52 and 53) of the cone gears 54 and 55. Fixedly secured to shaft 81, at the lower end thereof, is a rack 82 which meshes with pinion 80. Thus, when shaft 77 is rotated by rotation of knob 78, the rack 82 is driven by means of pinion 80 to move shaft 81 lengthwise or longitudinally in one direction or the other, depending upon the direction of rotation of knob 78.

A fixed flanged member or bracket 83 (see FIG. 8) surrounds shaft 81 and is fixedly secured thereto, as by means of a pin indicated at 84. Member 83 has lower and upper arcuate flanges 85 and 86 which extend outwardly in a horizontal direction from the main more or less cylindrical body thereof, at one side, and these flanges together embrace the "high" carrier 49 to cause it to move lengthwise of shaft 45 when rack 82 is driven by rotation of knob 78. The side of member 83 opposite flanges 85 and 86 is made flat, so as to have a substantially rectangular configuration in side elevation (just as is the flanged side of this member, except of course for the flanges 85 and 86). In similar fashion, the front side of member 83 is made flat, so as to also have a substantially rectangular configuration in front elevation.

An adjustable flanged member or bracket 87, preferably formed from sheet steel, has an L-shaped main body (in horizontal cross-section) plus a pair of spaced arcuate flanges 88 and 89 which extend outwardly in a horizontal direction from its main body. The upper and lower flanges 89 and 88 together embrace the "low" carrier 48 to cause it to move lengthwise of shaft 44 when rack 82 is driven by rotation of knob 78. According to this invention, the member 87 is made adjustable with respect to member 83 and with respect to shaft 81, so that member 87 may be shifted along shaft 81 to a predetermined position, and then locked in this adjusted position. By way of example, member 87, by appropriate manipulation which will be described, may be slid upwardly (with respect to member 83 and shaft 81) from the position illustrated in FIG. 8, and then locked or secured in this new position. FIG. 8 illustrates a position of adjustment wherein flanges 88 and 89 are in horizontal alignment with flanges 85 and 86, respectively. In this illustrated position, gears 50 and 51 mesh with aligned levels of the cone gears 54 and 55, respectively. When member 87 is shifted from this position, its flanges 88 and 89, embracing as they do carrier 48, cause corresponding shifting of carrier 48 and its gears 46 and 50, with respect to shaft 81. Thus, when member 87 has been shifted from its FIG. 8 position to some new position, and then locked in this latter position, the gears 50 and 51 will mesh with non-aligned levels of the respective cone gears 54 and 55. Specifically, in this new position gear 50 will register with a level of the cone gear 54 which is above the level of cone gear 55 with which gear 51 is concomitantly in registry. This will be explained in more detail hereinafter.

The legs of the "L" of member 87 engage the flat front and left-hand faces, respectively, of member 83 (see FIG. 8), and are adapted to slide therealong when member 87 is being adjusted. Four tapped holes 90–93 which extend transversely to the axis of shaft 81, are provided in member 83. These holes are vertically aligned and are substantially uniformly spaced from each other in a direction parallel to the longitudinal axes of shaft 81 and of cone gears 54 and 55, the spacing between adjacent ones of the holes 90–93 being equivalent to the spacing between adjacent levels of the cone gears 54 and 55. A clearance hole 94 is provided in the front "L" leg of member 87, between the planes of the flanges 88 and 89 but near the lower flange 88, and a screw 95 is threaded into tapped hole 90, which is the lowermost one of the holes 90–93. It can be seen that, in order to adjustably shift the position of member 87 (and thereby also of gears 46 and 50) relative to member 83 (and its gears 47 and 51), from the position of FIG. 8, screw 95 is unscrewed from tapped hole 90, and then member 87 is slid vertically upwardly along member 83 until hole 94 is aligned with the desired one of the tapped holes 91–93, following which screw 95 is reinserted and tightened. As previously explained, when member 87 is slid in this manner the gears 46 and 50 are slid correspondingly, gear 46 sliding along its shaft 44. Once this adjustment has been made (to bring gear 50 into registry with the desired level of cone gear 54, relative to the level of cone gear 55 with which gear 51 is concomitantly in registry), rotation of knob 78 drives rack 82 to move both carriers 48 and 49 (and all of the gears carried by both carriers) simultaneously, for registry of gears 50 and 51 with selected levels of the cone gears 54 and 55, respectively.

At the rear end of shaft 77 there is secured a disc 96 (see FIG. 9) carrying a series of pins 97 of which the end pins are particularly designated as 97A and 97B. The nose portion 98 of a lever 99 is arranged to pass between pairs of these pins. Lever 99 is provided with a pointed end having a cam action on the pins to enforce alignment of the shaft 77 in particular positions when engagement is produced. The lever arm 99 is secured to the shaft 75. Pins 100 and 101 are provided as shown, to prevent full inward movement of the nose 98 of lever 99 when the nose projects between the end pins and the next adjacent pins 97 in the series.

Figure 10:
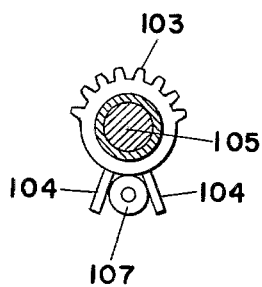
FIG. 10 is a sectional detail of a clutch arrangement.
Figure 4:
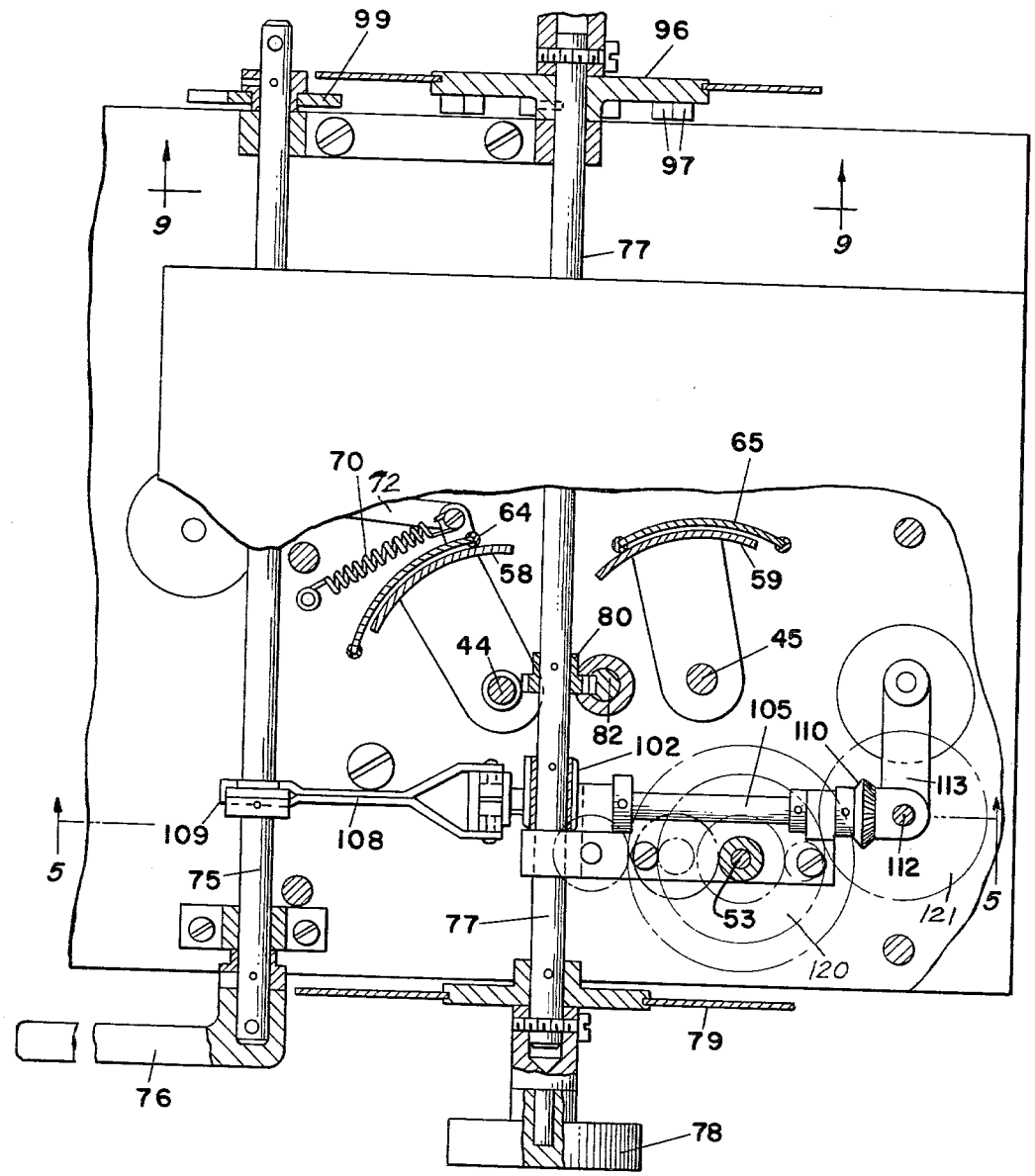
FIG. 4 is another plan view, similar to FIG. 2, but showing various elements in section on the plane indicated at 4—4 in FIG. 5.

The shaft 77 is provided with a helical gear 102 which meshes with a wheel segment 103 (see FIGS. 4, 5, and 10), which latter is provided with a pair of pins 104 extending radially therefrom. The segment 103 is journaled on a shaft 105 to which is splined a member 106 carrying a cone-shaped pin 107 arranged to engage between the pins 104. The member 106 is circumferentially grooved for engagement by segmental members carried by the forked end of a link 108 which is pivoted to an arm 109 carried by the shaft 75. A clutch arrangement is thus provided, the shaft 105 being clutched to the wheel segment 103 when the pin 107 is engaged between the pins 104. Normally, when the handle 76 is in its raised position, the shaft 75 is in an extreme clockwise position as viewed from the front of the apparatus and the clutch arrangement just described is disengaged.

A bevel pinion 110 is secured to the right-hand end of shaft 105 and meshes with the bevel teeth of a member 111 secured to a shaft 112 and provided with an arm 113 (see FIG. 4) which provides a part of the valve driving connection referred to heretofore as 43.

A pinion 114 secured to the shaft 52 meshes with a gear 115 which is journaled about the axis of the shaft 53 and is provided with pins mounting the planet pinions 116 which mesh with a sun pinion 117 secured to the shaft 53. The pinions 116 are integrally formed with smaller pinions 118 which mesh with a central pinion 119 to which is secured a gear 120 meshing with a gear 121 journaled on the shaft 112. A spring-urged pin 122 is carried by a member 123 secured to the shaft 112 and by engagement in a shallow opening in the gear 121 provides a yielding drive connection between the gear 121 and the shaft 112. Under normal conditions of operation, the gear 121 may be considered to be secured to the shaft 112, but the detent arrangement is arranged to yield, in case of jamming, to prevent damage by breaking the connection between the gear and the shaft.

It is desired to be pointed out, at this juncture, that the gearing 115–119 comprises the subtractive differential 42 previously referred to. The "low" cone gear 54, driving shaft 52 and pinion 114 secured thereto, provides one input to this differential. The "high" cone gear 55, driving shaft 53 and sun pinion 117 secured thereto, provides the other input to this differential. The output from this differential is taken by gear 120, which is secured to pinion 119 and which meshes with gear 121, the latter being in effect secured to shaft 112.

Although this is not illustrated in the drawings (for purposes of simplicity), one end of a link member is coupled to the upper (in FIG. 4) end of arm 113, and the other end of this link member is adjustably coupled to the operating arm of a proportioning valve for proportioning the flow of the two liquids, the "high" gasoline and the "low" gasoline. The adjustable coupling referred to includes a set (nine in number, for a "nine-stop" pump) of spaced holes arranged along the radially-extending operating arm of the valve; by shifting the link to different holes in the valve operating arm, the ratio of the coupling between blend selector shaft 77 and the proportioning valve (and thus the rate of rotation of this valve, as shaft 77 is rotated) can be varied.

Although the proportioning valve is indicated in FIG. 1 as comprising two separate valves 18 and 19, actually these two valves are arranged as two separate valve members operating in respective chambers in a single outer housing, controlled by a single operating arm. The construction of this valve, and its arrangement for control by the output of the differential 42, are disclosed in detail in my aforementioned '970 patent and, since such forms no part of the present invention, it will not be described in detail herein.

The operation of the blend control unit or portion of the "pump" will now be described. Reference may be made, in this connection, to FIG. 11, which is a simplified, schematic drawing of the blend control unit, as set (by rotation of handle 78, which produces lengthwise movement of shaft 81, in the manner aforesaid) to cause dispensing of a blend of equal proportions of "high" and "low" gasoline. FIG. 11 depicts an adjustment of member 87 relative to member 83 such that gears 50 and 51 register with aligned levels of the respective cone gears 54 and 55. This is the adjustment previously described, wherein screw 95 is threaded into hole 90, the lowermost tapped hole of member 83.

The principle of operation of the described apparatus will become evident if it is considered that, a mixture of the liquids being dispensed, the gears 50 and 51 are meshed with corresponding spur gears (in particular levels) of the cone gears 54 and 55. The inputs from the meters 7 and 15 occurring at 36 and 38, respectively, will effect drives of the cone gear shafts 52 and 53 (through the respective gears 46, 50 and 47, 51) in accordance with the chosen setting, and the differential 42 provides an output which is equal to the difference in rotations of the shafts 52 and 53. Assuming that the flows through the meters are such that this output is zero, this means that the flows through the two meters are in a ratio corresponding to the setting of the gears. If the flows are not in this ratio, then an output is provided from the differential gearing (in 42) which will effect a resetting of the valves 18 and 19 in a direction to increase the flow of one liquid and decrease that of the other, to provide the desired ratio. Equilibrium is then attained when the flows are in the ratio determined by the gear settings.

For the setting of the gears illustrated in FIG. 11, wherein gear 50 is in mesh with the thirty-two-tooth level of cone gear 54 and gear 51 is in mesh with the thirty-two-tooth level of cone gear 55, equilibrium is reached when meters 7 and 15 rotate at the same speed (which causes shafts 52 and 53 to rotate at the same speed), which means that the valves 18 and 19 are set for equal flows.

The foregoing has assumed that both liquids (i.e., both fuel constituents) are being dispensed. Automatic operation of the gearing and differential occurs only under such conditions. However, when only one of the liquids is to be dispensed, the setting is manual, with one or the other of the valves 18 and 19 completely closed and the other wide open.

When the mechanism is at rest, the released condition of the handle 76 results in maintenance of the shaft 77 in its set position, by reason of the engagement of the nose 98 of lever 99 between a pair of the pins 97. Readjustment of the shaft 77 can only be effected by the rocking of shaft 75 by the handle 76. The rocking of shaft 75 not only releases gears 50 and 51 from mesh and the nose 98 from between the pins 97, but prior to complete release of these pins the counterclockwise rocking of shaft 75 forces the conical pin 107 between the pins 104 to couple the shaft 105 to the member 103.

To effect the dispensing of a single liquid, the handle 76 is depressed, effecting the actions just noted, and the knob 78 is then turned to a position in which the space between pin 97B and the next adjacent pin 97, or the space between pin 97A and its next adjacent pin 97, is brought into alignment with the nose 98 of lever 99. During the adjustment, the pin 107 clutches the shaft 105 to the member 103, so that the adjustment of shaft 77 will move one or the other of valves 18 or 19 to the fully closed position and the other to its fully open position. The release of the handle 76 then permits the nose 98 to enter the aligned space between pins, but the handle 76 and shaft 75 cannot return to normal position, because of the interposition of one or the other of pins 100 or 101. The prevention of full return of shaft 75 maintains gears 50 and 51 out of mesh with their cone gears, and also prevents the complete withdrawal of pin 107. The dispensing operation then effects dispensing of only one liquid, the gearing being in effect inoperative, with one or the other of the gears 50 or 51 rotating idly, depending upon whether "low" or "high" gasoline, respectively, is being dispensed.

Refer again to FIG. 11. The rotation of shaft 77 (by knob 78) to a position to effect dispensing of solely "high" gasoline drives shaft 81 lengthwise to a position wherein proportioning gear 50 is above the eight-tooth (upper) end of cone gear 54, and proportioning gear 51 is above the fifty-six-tooth (upper) end of cone gear 55. Manipulation of knob 78 to effect dispensing of solely "low" gasoline drives shaft 81 lengthwise to a position wherein proportioning gear 50 is below the fifty-six-tooth (lower) end of cone gear 54, and proportioning gear 51 is below the eight-tooth (lower) end of cone gear 55. The dispensing of blends of the "high" and "low" gasolines is effected by manipulating knob 78 to bring gears 50 and 51 concomitantly into registry with selected (and aligned) levels of cone gears 54 and 55, respectively.

For the adjustment of member 87 relative to member 83 which is depicted in FIG. 11, wherein the proportioning gears 50 and 51 are horizontally aligned and concomitantly register with aligned levels of the respective cone gears 54 and 55, there are available nine "stops," that is, nine selected angular positions of shaft 77, for the dispensing of nine grades of gasoline. These nine "stops" are represented by the seven levels of the cone gears 54 and 55 (corresponding to the seven possible blends of the two liquids), plus the positioning of gears 50 and 51 above the cone gears (for the dispensing of solely "high" gasoline), plus the positioning of gears 50 and 51 below the cone gears (for the dispensing of solely "low" gasoline). These nine angular positions of shaft 77 also correspond to the nine spaces between pins 97 which are of sufficient width to accommodate the nose 98 of lever 99.

From a consideration of the number of teeth on the respective levels of the cone gears 54 and 55 (as set out hereinabove), it may be seen that, for the "nine-stop" adjustment depicted in FIG. 11, the blends are spaced (between the upper and lower limits of solely "high" and solely "low," respectively) in equal ⅛ (12.5 percent) steps or increments, referring to the relative volumes of the two liquids in the blends. That is to say, the uppermost "stop" would provide zero parts of "low" gasoline or 100 percent "high" gasoline; the next lower "stop" would provide one part of "low" and seven parts of "high" or 12.5 percent "low" and 87.5 percent "high"; the next lower stop, two parts of "low" and six parts of "high" or 25 percent "low" and 75 percent "high"; the next stop, three parts of "low" and five parts of "high" or 37.5 percent "low" and 62.5 percent "high"; the next lower stop, four parts of "low" and four parts of "high" or 50 percent "low" and 50 percent "high" (this is the gear setting illustrated in FIG. 11); the next lower stop, five parts of "low" and three parts of "high" or 62.5 percent "low" and 37.5 percent "high"; the next stop, six parts of "low" and two parts of "high" or 75 percent "low" and 25 percent "high"; the next lower stop, seven parts of "low" and one part of "high" or 87.5 percent "low" and 12.5 percent "high"; the lowermost stop would provide zero parts of "high" or 100 percent "low."

In order to adjust the "pump" to dispense a maximum of eight grades of gasoline, the screw 95 (FIG. 8) is removed, following which the flanged member or movable bracket 87 (and also the gears 46 and 50, moved thereby) is moved upwardly with respect to flanged member 83, and the screw 95 is then threaded into tapped hole 91 of member 83. For adjustment to seven "stops," screw 95 would be threaded into tapped hole 92, and for adjustment to six "stops," screw 95 would be threaded into tapped hole 93.

Figure 12:
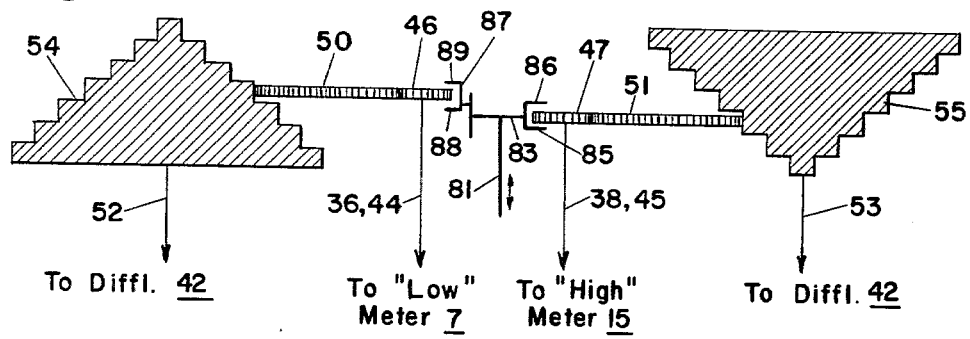
FIG. 12 is a simplified block diagram, similar to FIG. 11, but illustrating a different "stop adjustment"

The "eight-stop" adjustment is depicted in FIG. 12. In this case, the proportioning gears 50 and 51 concomitantly register with non-aligned levels of the respective cone gears 54 and 55. In fact, gear 50 now registers with cone gear 54 at one level above the registery of gear 51 with cone gear 55. Now, the uppermost "stop" corresponds to the positioning of gear 50 above the eight-tooth (upper) end of cone gear 54, while gear 51 is then aligned with the fifty-six-tooth level of cone gear 55. In this gear setting, solely "high" gasoline is dispensed. For the next lower stop, gear 50 meshes with the eight-tooth level of gear 54 and gear 51 with the forty-eight-tooth level of gear 55; for the next lower stop, gear 50 registers with the sixteen-tooth level of gear 54 and gear 51 with the forty-tooth level of gear 55; for the next stop, gear 50 registers with the twenty-four-tooth level of gear 54 and gear 51 with the thirty-two-tooth level of gear 55; for the next lower stop, gear 50 registers with the thirty-two-tooth level of gear 54 and gear 51 with the twenty-four-tooth level of gear 55 (this is the position illustrated in FIG. 12); for the next stop, gear 50 meshes with the forty-tooth level of gear 54 and gear 51 with the sixteen-tooth level of gear 55; for the next lower stop, gear 50 registers with the forty-eight-tooth level of gear 54 and gear 51 with the eight-tooth level of gear 55; for the lowermost stop, gear 50 is in alignment with the fifty-six tooth level of cone gear 54 and gear 51 is positioned below the eight-tooth (lower) end of cone gear 55. In this latter or lowermost gear setting, solely "low" gasoline is dispensed.

For the "eight-stop" adjustment depicted in FIG. 12, the blends are spaced (between the upper and lower limits of solely "high" and solely "low," respectively) in equal ⅐ (approximately 14.3 percent) steps or increments, referring to the relative volumes of the two liquids in the blends. The uppermost stop would provide zero parts of "low" gasoline or 100 percent "high" gasoline; the next lower stop would provide one part of "low" and six parts of "high" or ⅐ "low" and 6/7 "high"; the next lower stop, two parts of "low" and five parts of "high" or 2/7 "low" and 5/7 "high"; the next stop, three parts of "low" and four parts of "high" or 3/7 "low" and 4/7 "high"; the next lower stop, four parts of "low" and three parts of "high" or 4/7 "low" and 3/7 "high" (this is the gear setting illustrated in FIG. 12); the next lower stop, five parts of "low" and two parts of "high" or 5/7 "low" and 2/7 "high"; the next stop, six parts of "low" and one part of "high" or 6/7 "low" and ⅐ "high"; the lowermost stop would provide zero parts of "high" or 100 percent "low."

When the "pump" is adjusted from nine "stops" to some lesser number of "stops," it is necessary to change the position of one of the pins 100 or 101 on the disc 96, such that when the shaft 77 is rotated to an angular position suitable for the dispensing of only "high" gasoline (to wit, a position wherein gear 50 is moved to a location above the eight-tooth or upper end of cone gear 54), the handle 76 and shaft 75 will be prevented from returning to normal position because of the interposition of this (moved) pin. This prevents the complete withdrawal of pin 107. Also, of course, this maintains gears 50 and 51 out of mesh.

Along with the foregoing change, an adjustment of the mechanism must be made such that when the blend selector shaft 77 is rotated to the new, changed angular position required for the dispensing of solely "high" gasoline under the "eight-stop" adjustment, the valve 18 will be moved to the fully closed position and the valve 19 to the fully open position. The link member (previously mentioned but not shown) which connects arm 113 to the proportioning valve operating arm must be shifted to a hole in this latter arm which is closer to the center of rotation thereof, thereby changing the ratio of coupling (between shaft 77 and the proportioning valve) to move the valve faster, as shaft 77 is rotated.

When the "pump" is adjusted to a still lesser (i.e., less than eight) number of "stops," such as seven or six, the blends are again spaced (between the upper and lower limits of solely "high" and solely "low," respectively) in equal steps or increments, referring to the relative volumes of the two liquids in the blends. This comes about because of the number of teeth in the various levels of the cone gears, and because of the manner in which this adjustment is effected (i.e., by shifting of the "low" proportioning gear 50 upward relative to the "high" proportioning gear 51).

Although the previous description has described specifically the adjustment of the "pump" through a range of nine "stops" down through six "stops," the same principles may be used to extend the "stop adjustment" range on down to three "stops"; of course, a "two-stop" pump would dispense only "low" gasoline alone or "high" gasoline alone, and no blends of these two gasolines, so the cone gears would in this case not be utilized, or needed. The same equal-increment feature of the blend-steps prevails throughout the adjustment range, down to three "stops."

Figure 13:
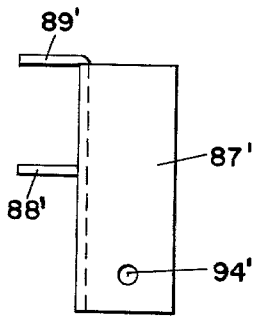
FIG. 13 is a front elevation of a modified bracket.

Because of space limitations, a modified movable bracket or flanged member 87' (see FIG. 13) must be used to cover the range of five to three "stops." This member is generally similar to member 87, so is referred to by the same reference numerals, but carrying prime designations. The member 87' is longer (in the vertical direction) than member 87, and the clearance hole 94' (for the locking screw 95) is located below the plane of the upper flange 88', rather than between the planes of the two flanges, like hole 94.

In order to adjust the "pump" to dispense a maximum of five grades of gasoline, for example, the flanged member or movable bracket 87' is used, and screw 95 is inserted through clearance hole 94' and threaded into tapped hole 90 of member 83. For adjustment to four "stops," screw 95 would pass through hole 94' and be threaded into tapped hole 91, and for adjustment to three "stops," screw 95 would pass through hole 94' and be threaded into tapped hole 92.

Figure 14:
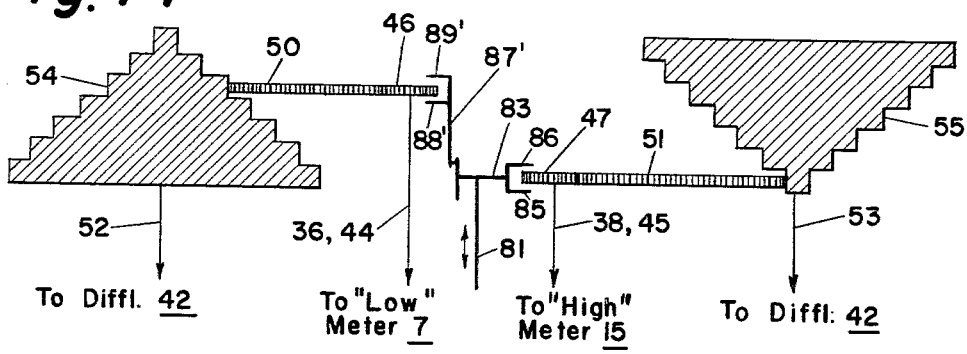
FIG. 14 is another block diagram, similar to FIG. 12, but illustrating a different "stop adjustment"

The "five-stop" adjustment is depicted in FIG. 14. Here again, the proportioning gears 50 and 51 concomitantly register with non-aligned levels of the respective cone gears 54 and 55. In fact, gear 50 now registers with cone gear 54 at four levels above the level registry of gear 51 with cone gear 55. Now, the uppermost "stop" corresponds to the positioning of gear 50 above the eight-tooth (upper) end of cone gear 54, while gear 51 is then aligned with the thirty-two-tooth level of cone gear 55. In this gear setting, solely "high" gasoline is dispensed. For the next lower stop, gear 50 meshes with the eight-tooth level of gear 54 and gear 51 with the twenty-four-tooth level of gear 55; for the next lower stop, gear 50 registers with the sixteen-tooth level of gear 54 and gear 51 with the sixteen-tooth level of gear 55; for the next stop, gear 50 registers with the twenty-four-tooth level of gear 54 and gear 51 with the eight-tooth level of gear 55 (this is the position illustrated in FIG. 14); for the lowermost stop, gear 50 is in alignment with the thirty-two-tooth level of cone gear 54 and gear 51 is positioned below the eight-tooth (lower) end of cone gear 55.

For the "five-stop" adjustment depicted in FIG. 14, the blends are spaced (between the upper and lower limits of solely "high" and solely "low," respectively) in equal ¼ (25 percent) steps or increments, referring to the relative volumes of the two liquids in the blends. The uppermost stop would provide zero parts of "low" gasoline or 100 percent "high" gasoline; the next lower stop would provide one part of "low" and three parts of "high" or 25 percent "low" and 75 percent "high"; the next lower stop, two parts of "low" and two parts of "high" or 50 percent "low" and 50 percent "high"; the next stop, three parts of "low" and one part of "high" or 75 percent "low" and 25 percent "high" (this is the gear setting illustrated in FIG. 14); the lowermost stop would provide zero parts of "high" or 100 percent "low."

It is desired to be pointed out at this juncture that the adjustable-stop concept of this invention involves the adjustment or shifting of one of the proportioning gears relative to the other, in a direction parallel to the longitudinal axis of the cone gears. Insofar only as the correct blend proportioning is concerned, it would not make any difference which of the two proportioning gears is made stationary with respect to shaft 81, and which is made adjustable with respect to this shaft. That is to say, for an adjustment in the number of stops which eliminates one or more stops at the "high" end of the blend scale, the proper blend proportioning would be achieved under either of the following adjustment possibilities: (1) "high" proportioning gear 51 held stationary with respect to shaft 81 and "low" proportioning gear 50 adjustable upwardly with respect to the shaft and gear 51; or (2) "low" proportioning gear 50 held stationary with respect to shaft 81 and "high" proportioning gear 51 adjustable downwardly with respect to the shaft and gear 50.

The foregoing has described the structure for only the first of the two adjustment possibilities, as it is by far the more practical of the two; the reason for this will now be explained. The shaft 81 is geared (by means of rack 82 and pinion 80) to shaft 77, which carries a dial 79 indicating the quality of fuel to be delivered (i.e., the particular blend selected for dispensing). To avoid having to replace this dial when a change is made in the number of stops, the shaft 77 should be brought to the same angular position for a particular blend, regardless of the particular stop-adjustment of the dispensing apparatus (pump); this requires that the proportioning gear which is fixed to shaft 81 be that one which remains in the same position relative to its cone gear (for a particular blend, such as for example the one corresponding to the second lowermost stop) when the stop-adjustment is changed. It will be realized, from what has gone before, that the proportioning gear which answers this description is the "high" proportioning gear 51. Consequently, the "high" proportioning gear 51 is fixed with respect to shaft 81 and the "low" proportioning gear 50 is adjustable upwardly with respect to shaft 81 and gear 51, to adjust the dispensing apparatus from nine to a lesser number of stops. Stating that the "high" proportioning gear is fixed with respect to shaft 81 means that the fixed bracket 83 is associated with "high" carrier 49 and with "high" pinion 47 and "high" proportioning gear 51; stating that the "low" proportioning gear 50 is adjustable with respect to shaft 81 means that the adjustable bracket 87 is associated with "low" carrier 48 and with "low" pinion 46 and "low" proportioning gear 50.

Refer now to FIG. 15, which is generally similar to FIG. 11 but which illustrates (in somewhat schematic form) a different blend control unit arrangement, the FIG. 15 arrangement corresponding to that disclosed in my aforementioned '908 patent. FIG. 15 depicts a "stop" adjustment such that gears 50 and 51 register with non-aligned levels of the respective cone gears 54 and 55; in this figure, gear 51 registers with a level of cone gear 55 which is one step below the level at which gear 50 registers with cone gear 54. In FIG. 15, the output 36 from "low" meter 7, through intervening gearing which is not particularly significant from a functional standpoint, drives the shaft 52 which carries the cone gear 54. In this way, input is provided to the "low" gear box 37 (see FIG. 1) which includes gear 54. The output 38 from "high" meter 15, through intervening gearing not particularly significant from a functional standpoint, drives the shaft 53 which carries cone gear 55. In this way, input is provided to the "high" gear box 39 which includes gear 55.

The gear cone 54 drives through proportioning gear 50 and pinion 46 (which latter two gears are shiftable by longitudinal movement of shaft 81, for blend selection) a shaft which corresponds to the output 40 of the "low" gear box 37. The output 40 provides one input to the subtractive differential 42. The gear cone 55 drives through proportioning gear 51 and pinion 47 (which latter two gears are shiftable by longitudinal movement of shaft 81, for blend selection) a shaft which corresponds to the output 41 of the "high" gear box 39. The output 41 provides a second input to the differential 42.

As previously described, the output 43 of differential 42 controls concurrently the relative positions of the "low" and "high" proportioning valves 18 and 19, which (just as in FIG. 11) are illustrated as being in a single "valve" unit.

In FIG. 15, the gear box 37 may be thought of as including gears 54, 50, and 46, while the gear box 39 may be thought of as including gears 55, 51, and 47. The settings of the gear boxes 37 and 39 (i.e., the particular levels of the gear cones with which the respective proportioning gears are in mesh) determine the relative flows which would be required to maintain at zero the output 43 of differential 42 to hold the valves 18, 19 in fixed relative position. If the rate of flow of "high" gasoline relative to "low" gasoline exceeds the predetermined ratio, the differential 42 will have an output (at 43) of such direction as to move the "high" valve 19 toward closed position and the "low" valve 18 toward open position. The result is readjustment of the individual flows to a ratio predetermined by the gear box settings and resulting in zero output from differential 42. If the "low" flow is in excess, a reverse output from the differential 42 occurs, resulting in correction of the ratio of the flows. Thus, the composition of the blend delivered is maintained at a predetermined fixed value.

It may be seen that in FIG. 15 the couplings to the gear boxes of the "low" and "high" meters 7 and 15, and of the subtractive differential 42, are reversed as compared to FIG. 11. Because of this relative reversal, in FIG. 15 a stop adjustment (specifically, a stop adjustment which eliminates one or more stops at the "high" end of the blend scale) must (to avoid having to replace the blend indicator dial when an adjustment or change is made in the number of stops) be effected by mounting the "low" proportioning gear 50 in fixed position on shift 81 and by mounting the "high" proportioning gear 51 so that it can be adjusted downwardly with respect to this shaft and with respect to gear 50.

Refer now to FIG. 16, which is a front elevation of a stop adjustment bracket assembly suitable for the FIG. 15 blend control unit. A fixed flanged member or bracket 83' surrounds shaft 81 and is fixedly secured thereto, as by means of a pin indicated at 84. Member 83' has lower and upper arcuate flanges 85' and 86' which extend outwardly in a horizontal direction from the main more or less cylindrical body thereof, at one side, and these flanges together embrace the "low" carrier 48 to cause it to move lengthwise of its shaft 44 when shaft 81 is moved vertically (longitudinally) to select the desired blend of "high" and "low" gasolines. The side of member 83' opposite flanges 85' and 86' is made flat, so as to have a substantially rectangular configuration in side elevation. In similar fashion, the front side of member 83' (i.e., the side presented to the viewer in FIG. 16) is made flat, so as to also have a substantially rectangular configuration in front elevation, as shown.

An adjustable flanged member or bracket 87" has an L-shaped (in horizontal cross-section) main body plus a pair of spaced arcuate flanges 88" and 89" which extend outwardly in a horizontal direction from its main body. The lower and upper flanges 88" and 89" together embrace the "high" carrier 49 to cause it to move lengthwise of its shaft 45 when shaft 81 is moved vertically (longitudinally) to select the desired blend. The member 87" is adjustable with respect to member 83' and with respect to shaft 81, so that member 87" may be shifted along shaft 81 to a predetermined position, and then locked in this adjusted position. Member 87" may be slid downwardly from a position wherein flange 89" is horizontally aligned with flange 86', and wherein flange 88" is horizontally aligned with flange 85'. FIG. 16 illustrates a position of adjustment wherein flanges 89" and 88" are below a position of horizontal alignment with the respective flanges 86' and 85'. In this illustrated position, which corresponds to the position illustrated in FIG. 15, gear 51 meshes with cone gear 55 at a level one step below that at which gear 50 meshes with cone gear 54.

The legs of the "L" of member 87" engage the flat front and left-hand side faces, respectively, of member 83', and are adapted to slide therealong when member 87" is being adjusted. Four tapped holes 124–127, which extend transversely to the axis of shaft 81, are provided in member 83'. These holes are vertically aligned and are substantially uniformly spaced from each other in a direction parallel to the longitudinal axes of shaft 81 and of cone gears 54 and 55, the spacing between adjacent ones of the holes 124–127 being equivalent to the spacing between adjacent levels of the cone gears 54 and 55. A clearance hole 128 is provided in the front "L" leg of member 87", between the planes of the flanges 89" and 88", and a screw 129 passes freely through this hole and threads into one of the holes 124–127, to lock member 87" in the desired adjusted position. As illustrated in FIG. 16, screw 129 is threaded into tapped hole 125, which is the second one of the tapped holes when counting downwardly from the top of member 83'.

It can be seen that, in order to adjustably shift the position of member 87" (and thereby also of gears 47 and 51) relative to member 83' (and its gears 46 and 50), from the position of FIG. 16, screw 129 is unscrewed from tapped hole 125, and then member 87" is slid either vertically upwardly along member 83' until hole 128 is aligned with tapped hole 124, or vertically downwardly along member 83' until hole 128 is aligned with the desired one of the tapped holes 126 or 127, following which screw 129 is reinserted and tightened. When member 87" is slid in this manner the gears 47 and 51 are slid correspondingly, gear 47 sliding along its shaft 45. Once this adjustment has been made (to bring gear 51 into registry with the desired level of cone gear 55, relative to the level of cone gear 54 with which gear 50 is concomitantly in registry), rotation of the blend selector knob moves shaft 81 vertically (longitudinally) to move both carriers 48 and 49 (and all of the gears carried by both carriers) simultaneously, for registry of gears 50 and 51 with selected levels of the cone gears 54 and 55, respectively.

Now refer again to FIG. 15, and assume for the moment (though this is not illustrated) that member 87" has been adjusted, relative to member 83', to a position such that gears 50 and 51 register with aligned levels of the respective cone gears 54 and 55. This would correspond to a position (in FIG. 16) wherein screw 129 is threaded into hole 124, the uppermost tapped hole of member 83'. This assumed adjustment would provide nine "stops," just as in FIG. 11. These nine "stops" are represented by the seven levels of the cone gears 54 and 55 (corresponding to the seven possible blends of the two liquids), plus the positioning of gears 50 and 51 above the cone gears (for the dispensing of solely "low" gasoline), plus the positioning of gears 50 and 51 below the cone gears (for the dispensing of solely "high" gasoline).

For such an assumed "nine-stop" adjustment (taking into consideration the number of teeth on the respective levels of the cone gears 54 and 55, as set out previously, and the direct drive of the cone gears by the respective meters in FIG. 15), the blends are spaced (between the upper and lower limits of solely "low" and solely "high," respectively) in equal ⅛ (12.5%) steps or increments, referring to the relative volumes of the two liquids in the blends. That is to say, the uppermost "stop" would provide zero parts of "high" gasoline or 100 percent "low" gasoline; the next lower "stop" would provide one part of "high" and seven parts of "low" or 12.5 percent "high" and 87.5 percent "low"; the next lower stop, two parts of "high" and six parts of "low" or 25 percent "high" and 75 percent "low"; the next stop, three parts of "high" and five parts of "low" or 37.5 percent "high" and 62.5 percent "low"; the next lower stop, four parts of "high" and four parts of "low" or 50 percent "high" and 50 percent "low"; the next lower stop, five parts of "high" and three parts of "low" or 62.5 percent "high" and 37.5 percent "low"; the next stop, six parts of "high" and two parts of "low" or 75 percent "high" and 25 percent "low"; the next lower stop, seven parts of "high" and one part of "low" or 87.5 percent "high" and 12.5 percent "low"; the lowermost stop would provide zero parts of "low" or 100 percent "high."

FIG. 15 illustrates an adjustment of the "pump" for dispensing a maximum of eight grades (blends) of gasoline. From the assumed position for nine grades, the flange member 87'' (and also the gears 47 and 51, moved thereby) is moved downwardly with respect to flange member 83', and the screw 129 (FIG. 16) is threaded into tapped hole 125 of member 83'. For adjustment to seven "stops," screw 129 would be threaded into tapped hole 126, and for adjustment to six "stops," screw 129 would be threaded into tapped hole 127.

For the "eight-stop" adjustment depicted in FIG. 15, gear 51 registers with cone gear 55 at one level or step below the registry of gear 50 with gear cone 54. Now, the uppermost "stop" corresponds to the positioning of gear 50 above the eight-tooth (upper) end of cone gear 54, while gear 51 is then aligned with the fifty-six-tooth level of cone gear 55. In this gear setting, solely "low" gasoline is dispensed. For the next lower stop, gear 50 meshes with the eight-tooth level of gear 54 and gear 51 with the forty-eight-tooth level of gear 55; for the next lower stop, gear 50 registers with the sixteen-tooth level of gear 54 and gear 51 with the forty-tooth level of gear 55; for the next stop, gear 50 registers with the twenty-four-tooth level of gear 54 and gear 51 with the thirty-two-tooth level of gear 55; for the next lower stop, gear 50 registers with the thirty-two-tooth level of gear 54 and gear 51 with the twenty-four-tooth level of gear 55 (this is the position illustrated in FIG. 15); for the next stop, gear 50 meshes with the forty-tooth level of gear 54 and gear 51 with the sixteen-tooth level of gear 55; for the next lower stop, gear 50 registers with the forty-eight-tooth level of gear 54 and gear 51 with the eight-tooth level of gear 55; for the lowermost stop, gear 50 is in alignment with the fifty-six-tooth level of gear 54 and gear 51 is positioned below the eight-tooth (lower) end of cone gear 55. In this latter or lowermost gear setting, solely "high" gasoline is dispensed.

For the "eight-stop" adjustment depicted in FIG. 15, the blends are spaced (between the upper and lower limits of solely "low" and solely "high," respectively) in equal ⅐ (approximately 14.3 percent) steps or increments. The uppermost stop would provide zero parts of "high" gasoline or 100 percent "low" gasoline; the next lower stop would provide one part of "high" and six parts of "low" or ⅐ "high" and 6/7 "low"; the next lower stop, two parts of "high" and five parts of "low" or 2/7 "high" and 5/7 "low"; the next stop, three parts of "high" and four parts of "low" or 3/7 "high" and 4/7 "low"; the next lower stop, four parts of "high" and three parts of "low" or 4/7 "high" and 3/7 "low" (this is the gear setting illustrated in FIG. 15); the next lower stop, five parts of "high" and two parts of "low" or 5/7 "high" and 2/7 "low"; the next stop, six parts of "high" and one part of "low" or 6/7 "high" and ⅐ "low"; the lowermost stop would provide zero parts of "low" or 100 percent "high."

The invention claimed is:

1. In a selective gearing arrangement, a first cone gear comprising N spur gears arranged in N levels, where N is an integer greater than one, the number of teeth in each of said spur gears being different and varying in regular fashion from one end to the other of the cone; a second cone gear identical to said first gear and disposed in parallel but inverted relation with respect to said first gear with the levels of said second gear aligned respectively with the levels of said first gear; first and second proportioning gears adapted to mesh, respectively, with said first and second cone gears; and common means for moving said proportioning gears in a direction parallel to the longitudinal axes of said cone gears, thereby to bring said proportioning gears into registry with selected levels of said cone gears, said means being adjustable to shift the position of one proportioning gear relative to the other in a direction parallel to said longitudinal axes, to thereby cause said proportioning gears to be concomitantly brought into registry with predetermined levels of the respective cone gears.

2. An arrangement as set forth in claim 1, wherein the range of adjustment of said one proportioning gear relative to the other includes a position in which said proportioning gears are caused to be concomitantly brought into registry with non-aligned levels of the respective cone gears.

3. An arrangement in accordance with claim 1, wherein said means includes a shaft movable in a direction parallel to said longitudinal axes, means fixedly securing said other proportioning gear to said shaft, and means adjustably securing said one proportioning gear to said shaft, whereby the position of said one proportioning gear may be adjusted along said shaft, relative to said other proportioning gear.

4. An arrangement in accordance with claim 1, wherein said means includes a shaft movable in a direction parallel to said longitudinal axes, means fixedly securing said other proportioning gear to said shaft, and means adjustably and lockably securing said one proportioning gear to said shaft, whereby said one proportioning gear may be adjusted to and then locked in a position along said shaft in which said proportioning gears concomitantly register with non-aligned levels of the respective cone gears.

5. In a selective gearing arrangement, a first cone gear comprising N spur gears arranged in N levels, the number of teeth in each of said spur gears being KM, where K is a constant and M is the number of the level of the spur gear under consideration counting from the apex of the cone, N, K, and M all being integers and M ranging from one through N; a second cone gear identical to said first gear and disposed in parallel but inverted relation with respect to said first gear with the levels of said second gear aligned respectively with the levels of said first gear; first and second proportioning gears adapted to mesh, respectively, with said first and second cone gears; and common means for moving said proportioning gears in a direction parallel to the longitudinal axes of said cone gears, thereby to bring said proportioning gears into registry with selected levels of said cone gears, said means being adjustable to shift the position of one proportioning gear relative to the other in a direction parallel to said longitudinal axes, to thereby cause said proportioning gears to be concomitantly brought into registry with predetermined levels of the respective cone gears.

6. An arrangement as set forth in claim 5, wherein the range of adjustment of said one proportioning gear relative to the other includes a position in which said proportioning gears are caused to be concomitantly brought into registry with non-aligned levels of the respective cone gears.

7. An arrangement as set forth in claim 5, wherein said means includes a shaft movable in a direction parallel to said longitudinal axes, means fixedly securing said other proportioning gear to said shaft, and means adjustably securing said one proportioning gear to said shaft, whereby the position of said one proportioning gear may be adjusted along said shaft, relative to said other proportioning gear.

8. An arrangement in accordance with claim 5, wherein said means includes a shaft movable in a direction parallel to said longitudinal axes, means fixedly securing said other proportioning gear to said shaft, and means adjustably and lockably securing said one proportioning gear to said shaft, whereby said one proportioning gear may be adjusted to and then locked in a position along said shaft in which said proportioning gears concomitantly register with non-aligned levels of the respective cone gears.

9. In apparatus for dispensing selected blends of two liquids A and B, a first meter for metering the flow of liquid A, a second meter for metering the flow of liquid B; a first cone gear comprising N spur gears arranged in N levels, where N is an integer greater than one, the number of teeth in each of said spur gears being different and varying in regular fashion from one end to the other of the cone, said first gear being driven from said first meter, during a dispensing operation, at a rate proportional to the flow of liquid A; a second cone gear identical to said first gear disposed in parallel but inverted relation with respect to said first gear with the levels of said second gear aligned respectively with the levels of said first gear, said second gear being driven from said second meter, during a dispensing operation, at a rate proportional to the flow of liquid B; first and second proportioning gears adapted to mesh, respectively, with said first and second cone gears; and common means for moving said proportioning gears in a direction parallel to the longitudinal axes of said cone gears, thereby to bring said proportioning gears into registry with selected levels of said cone gears, said means being adjustable to shift the position of one proportioning gear relative to the other in a direction parallel to said longitudinal axes, to thereby cause said proportioning gears to be concomitantly brought into registry with predetermined levels of the respective cone gears.

10. Apparatus as set forth in claim 9, wherein the range of adjustment of said one proportioning gear relative to the other includes a position in which said proportioning gears are caused to be concomitantly brought into registry with non-aligned levels of the respective cone gears.

11. Apparatus in accordance with claim 9, wherein said means includes a shaft movable in a direction parallel to said longitudinal axes, means fixedly securing said other proportioning gear to said shaft, and means adjustably securing said one proportioning gear to said shaft, whereby the position of said one proportioning gear may be adjusted along said shaft, relative to said other proportioning gear.

12. Apparatus in accordance with claim 9, wherein liquid A is a "high"-octane gasoline and liquid B is a "low"-octane gasoline, and wherein said means includes a shaft movable in a direction parallel to said longitudinal axes, means fixedly securing said second proportioning gear to said shaft, and means adjustably securing said first proportioning gear to said shaft, whereby the position of said first proportioning gear may be adjusted along said shaft, relative to said second proportioning gear.

13. In apparatus for dispensing selected blends of two liquids A and B, a first meter for metering the flow of liquid A in a first line, a second meter for metering the flow of liquid B in a second line; a first cone gear comprising N spur gears arranged in N levels, where N is an integer greater than one, the number of teeth in each of said spur gears being different and varying in regular fashion from one end to the other of the cone, said first gear being driven from said first meter, during a dispensing operation, at a rate proportional to the flow of liquid A in said first line; a second cone gear identical to said first gear disposed in parallel but inverted relation with respect to said first gear with the levels of said second gear aligned respectively with the levels of said first gear, said second gear being driven from said second meter, during a dispensing operation, at a rate proportional to the flow of liquid B in said second line; first and second proportioning gears adapted to mesh, respectively, with said first and second cone gears; common means for moving said proportioning gears in a direction parallel to the longitudinal axes of said cone gears, thereby to bring said proportioning gears into registry with selected levels of said cone gears, said means being adjustable to shift the position of one proportioning gear relative to the other in a direction parallel to said longitudinal axes, to thereby cause said proportioning gears to be concomitantly brought into registry with predetermined levels of the respective cone gears; a proportioning valve for controlling the liquid flows in said first and second lines; and means responsive to the rotations of said first and second proportioning gears for controlling said valve.

14. Apparatus as set forth in claim 13, wherein the range of adjustment of said one proportioning gear relative to the other includes a position in which said proportioning gears are caused to be concomitantly brought into registry with non-aligned levels of the respective cone gears.

15. Apparatus in accordance with claim 13, wherein said common means includes a shaft movable in a direction parallel to said longitudinal axes, means fixedly securing said other proportioning gear to said shaft, and means adjustably securing said one proportioning gear to said shaft, whereby the position of said one proportioning gear may be adjusted along said shaft, relative to said other proportioning gear.

16. Apparatus in accordance with claim 13, wherein liquid A is a "high"-octane gasoline and liquid B is a "low"-octane gasoline, and wherein said common means includes a shaft movable in a direction parallel to said longitudinal axes, means fixedly securing said second proportioning gear to said shaft, and means adjustably securing said first proportioning gear to said shaft, whereby the position of said first proportioning gear may be adjusted along said shaft, relative to said second proportioning gear.

References Cited by the Examiner

UNITED STATES PATENTS 2,880,908   4/1959   Young _____ 222—26
2,977,970   4/1961   Young _____ 222—26 X LOUIS J. DEMBO, *Primary Examiner.*